United States Patent
Jogadhenu (10) Patent No.: US 8,683,256 B2
(45) Date of Patent: Mar. 25, 2014

(54) METHOD AND SYSTEM FOR INTERFERENCE DETECTION AND MITIGATION

(75) Inventor: Saga Jogadhenu, San Diego, CA (US)

(73) Assignee: Entropic Communications, Inc., San Diego, CA (US)

( * ) Notice: Subject to any disclaimer, the term of this patent is extended or adjusted under 35 U.S.C. 154(b) by 666 days.

(21) Appl. No.: 12/822,578

(22) Filed: Jun. 24, 2010

(65) Prior Publication Data

US 2011/0320859 A1    Dec. 29, 2011

(51) Int. Cl.
*G06F 11/00* (2006.01)

(52) U.S. Cl.
USPC ............. 714/4.1; 714/5.11; 714/27; 714/47.1

(58) Field of Classification Search
USPC .................................... 714/4.1, 5.11, 27, 47.1
See application file for complete search history.

(56) References Cited

U.S. PATENT DOCUMENTS

| | | | |
|---|---|---|---|
| 6,442,129 B1 * | 8/2002 | Yonge et al. ................... | 370/204 |
| 7,469,337 B2 | 12/2008 | McNulty et al. | |
| 7,599,620 B2 * | 10/2009 | Graves et al. .................... | 398/51 |
| 7,742,556 B1 * | 6/2010 | Qian et al. ...................... | 376/376 |
| 7,852,868 B2 * | 12/2010 | Gardner et al. ................ | 370/438 |
| 7,876,697 B2 * | 1/2011 | Thompson et al. ........... | 370/252 |
| 8,068,871 B2 * | 11/2011 | Xhafa et al. ................ | 455/552.1 |
| 2001/0050592 A1 * | 12/2001 | Wright et al. ....................... | 330/2 |
| 2004/0081127 A1 * | 4/2004 | Gardner et al. ................ | 370/338 |
| 2005/0039103 A1 * | 2/2005 | Azenko et al. ................ | 714/776 |
| 2005/0193127 A1 | 9/2005 | Moore et al. | |
| 2005/0226161 A1 * | 10/2005 | Jaworski ........................ | 370/241 |
| 2007/0147377 A1 * | 6/2007 | Laroia et al. .................. | 370/392 |
| 2008/0101210 A1 * | 5/2008 | Thompson et al. ........... | 370/204 |
| 2008/0200129 A1 * | 8/2008 | Cooper et al. .............. | 455/67.14 |
| 2008/0212591 A1 * | 9/2008 | Wu et al. ................... | 370/395.21 |
| 2008/0247334 A1 * | 10/2008 | Lee et al. ........................ | 370/255 |
| 2008/0250133 A1 * | 10/2008 | Lee et al. ........................ | 709/223 |
| 2008/0279219 A1 * | 11/2008 | Wu et al. ........................ | 370/474 |
| 2009/0052464 A1 * | 2/2009 | Gardner et al. ................ | 370/436 |
| 2009/0092154 A1 * | 4/2009 | Malik et al. ................... | 370/480 |
| 2009/0116544 A1 * | 5/2009 | Zhang et al. ................... | 375/227 |
| 2009/0201885 A1 * | 8/2009 | Kuroda et al. ................ | 370/335 |
| 2009/0323684 A1 | 12/2009 | Chu et al. | |
| 2010/0124214 A1 * | 5/2010 | Karaoguz ...................... | 370/338 |
| 2010/0185731 A1 * | 7/2010 | Wu ................................. | 709/204 |
| 2010/0185918 A1 * | 7/2010 | Ashkenazi et al. ............ | 714/752 |
| 2010/0195555 A1 * | 8/2010 | Cheng et al. ................... | 370/312 |
| 2010/0238897 A1 * | 9/2010 | Kiribayashi ................... | 370/331 |
| 2010/0254278 A1 * | 10/2010 | Kliger et al. ................... | 370/252 |
| 2010/0281338 A1 * | 11/2010 | Liu ................................. | 714/758 |
| 2010/0296647 A1 * | 11/2010 | Chan ......................... | 379/413.02 |
| 2011/0069605 A1 * | 3/2011 | Laudel et al. ................. | 370/210 |
| 2011/0110662 A1 * | 5/2011 | Wellbrock et al. .............. | 398/45 |

FOREIGN PATENT DOCUMENTS

EP    1435747 A1    7/2004

* cited by examiner

*Primary Examiner* — Loan L. T. Truong
(74) *Attorney, Agent, or Firm* — Bruce Greenhaus; Richard Bachand (57) ABSTRACT

In a method for adjusting modulation on a network, a modulation profile of a network node on the network is set a specified density. A plurality of messages that are received at the network node are monitored on an ongoing basis. The modulation profile of the network node is updated continually based on the monitored messages. A determination is made that a predetermined class of messages is received incorrectly at the network node. The network node is disconnected from the network based on the incorrectly received predetermined class of messages and is reconnected to the network to initiate the network node on the network.

20 Claims, 5 Drawing Sheets

METHOD AND SYSTEM FOR INTERFERENCE DETECTION AND MITIGATION

FIELD

This disclosure is directed generally to a communication network, and in particular to improving network performance by detecting and mitigating interference.

BACKGROUND

In some networking environments, communication networks may be formed when multiple interoperable nodes communicating over a shared medium detect the existence of other nodes. One example of such a network is a network that operates in accordance to the Multimedia over Coax Alliance ("MoCA") MAC/PHY Specification v. 1.0 or v 1.1. In such a network, nodes may function as "client" or "slave" nodes, or as "master"/"network controller"/"network coordinator" ("NC") nodes. A network typically has a single NC node and any number of client nodes, and the NC node transmits beacons and other control information to manage the network.

MoCA networks may be used for networking over in-home coaxial cable using orthogonal frequency division multiplexing (OFDM) modulation of data. OFDM is a digital multi-carrier modulation method in which a frequency band corresponding to a carrier comprises a number of closely spaced orthogonal subcarriers that are used to transport data. Data is divided into separate streams for respective subcarriers. Each network node has a modulation profile that specifies the modulation used for subcarriers transmitted by that node. For example, in accordance with one modulation profile, a first subcarrier employs 16-QAM (quadrature amplitude modulation with 16 constellation points, each representing one of the possible values of a four binary digit information word). A second subcarrier employs a denser modulation, such as 64-QAM (having 64 possible constellation points, each representing one of the 64 possible values of a 6 bit information word, thus, transmitting more information bits on the second subcarrier in the same amount of time). Each of the other subcarriers have a particular modulation density which may be greater, lesser or the same as the first and second subcarriers). Accordingly, other types of modulation, e.g., binary phase shift keying (BPSK) or quadrature phase shift keying (QPSK), can be used as well. The denser a modulation profile is (i.e., the more constellation points, and thus the more bits the group of subcarriers is capable of transmitting in the same amount of time as a result of particular modulation on the subcarriers), the less robust communication is for the associated node. That is, transmission using a more dense modulation scheme will be more susceptible to noise and other factors in the channel that can cause the packet error rate to be higher.

Figure 1:
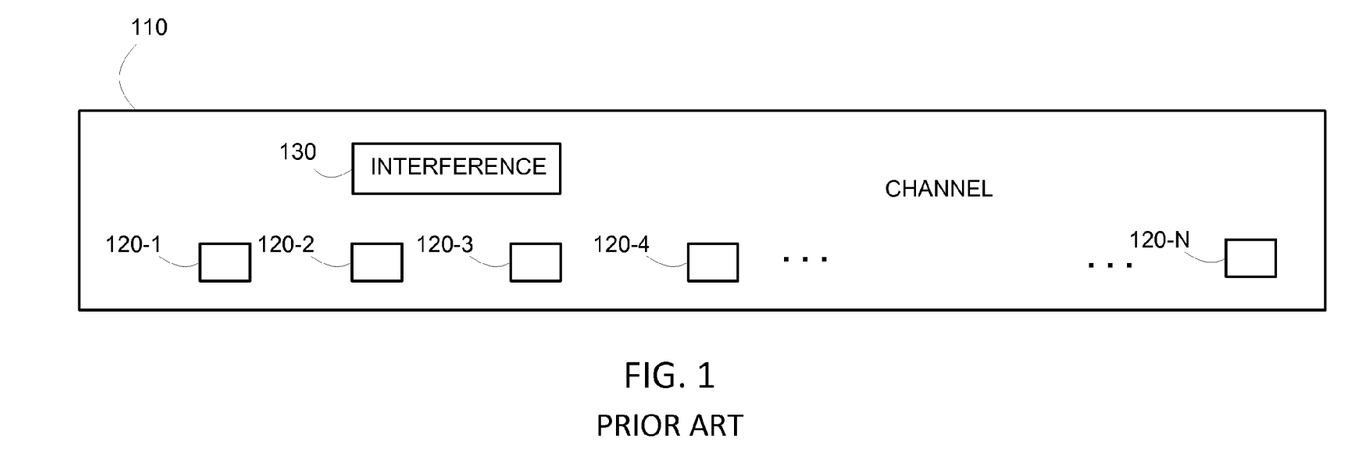
FIG. 1 is a block diagram of a known communications channel.

FIG. 1 is a diagram of a communications channel. A channel 110 may be a component of an RF frequency spectrum. Channel 110 may have a bandwidth of 50 MHz and may be centered at 575 MHz, although other bandwidths and center frequencies are available as well. OFDM transmits and receives data on subcarriers 120-1, 120-2, 120-3, 120-4, ..., 120-N (generally 120) within channel 110; MoCA provides N=224, i.e., 224 subcarriers. Subcarriers 120 may be spaced 195 kHz apart in accordance with MoCA.

Interference 130 may be present on channel 110 and may arise from various sources, e.g., television signals such as Advanced Television Systems Committee (ATSC) digital television broadcasting signals. An ATSC interference signal has 6 MHz bandwidth and may have various center frequencies. FIG. 1 shows interference 130, e.g., ATSC interference, occupying bandwidth in channel 110 corresponding to subcarriers 120-3 and 120-4. As used herein, the term "sustained interference" refers to interference that is substantially non-varying and continually present. Interference 130 may also be dynamic interference, as opposed to "sustained interference" and may be caused by turning on a television station transmitter, for example. Messages (e.g., packets) that are transmitted using OFDM with subcarriers 120-3 or 120-4 may be affected by interference 130 and may result in errors.

SUMMARY

In some embodiments, a method for adjusting the modulation of information onto subcarriers transmitted on a network is disclosed. A modulation profile of a network node on a network is set at a specified density. A plurality of messages that are received at the network node are monitored. The modulation profile of the network node is updated based on the monitored messages. If a determination is made that a predetermined class of messages is received with more than a prescribed error rate at the network node, then the network node is disconnected from the network and is reconnected to the network to re-initiate the network node on the network.

In some embodiments, a computer readable storage medium has instructions stored on it. When executed by a processor, the instructions cause the processor to perform the operations of the method described above.

In some embodiments, a network node has a receiver, a transmitter, and a processor. The receiver receives messages. The transmitter transmits data during initiation of the network node on the network. The processor is coupled to the transmitter and receiver. The processor: (1) sets a modulation profile of the network node at a specified density, (2) monitors the received messages, (3) updates the modulation profile of the network node based on the monitored messages, (4) determines that a predetermined class of messages is received incorrectly at the network node, (5) disconnects the network node from the network based on the error rate of a received predetermined class of messages, and (5) reconnects the network node to the network to re-initiate the network node on the network.

In some embodiments, a network controller has a receiver, a transmitter, and a processor. The receiver receives messages in support of a link maintenance operation (LMO) on a network. The transmitter transmits the messages in support of the LMO on the network. The processor is coupled to the transmitter and receiver. The processor: (1) monitors the messages on an ongoing basis, (2) determines that a predetermined class of messages is received with an excessive error rate, (3) disconnects an LMO network node from the network based on the error rate of the received predetermined class of messages, and (4) reconnects the LMO network node to the network to initiate the LMO network node on the network.

BRIEF DESCRIPTION OF THE DRAWINGS

The following will be apparent from elements of the figures, which are provided for illustrative purposes and are not necessarily to scale.

DETAILED DESCRIPTION

This description of the exemplary embodiments is intended to be read in connection with the accompanying drawings, which are to be considered part of the entire written description.

Figure 2:
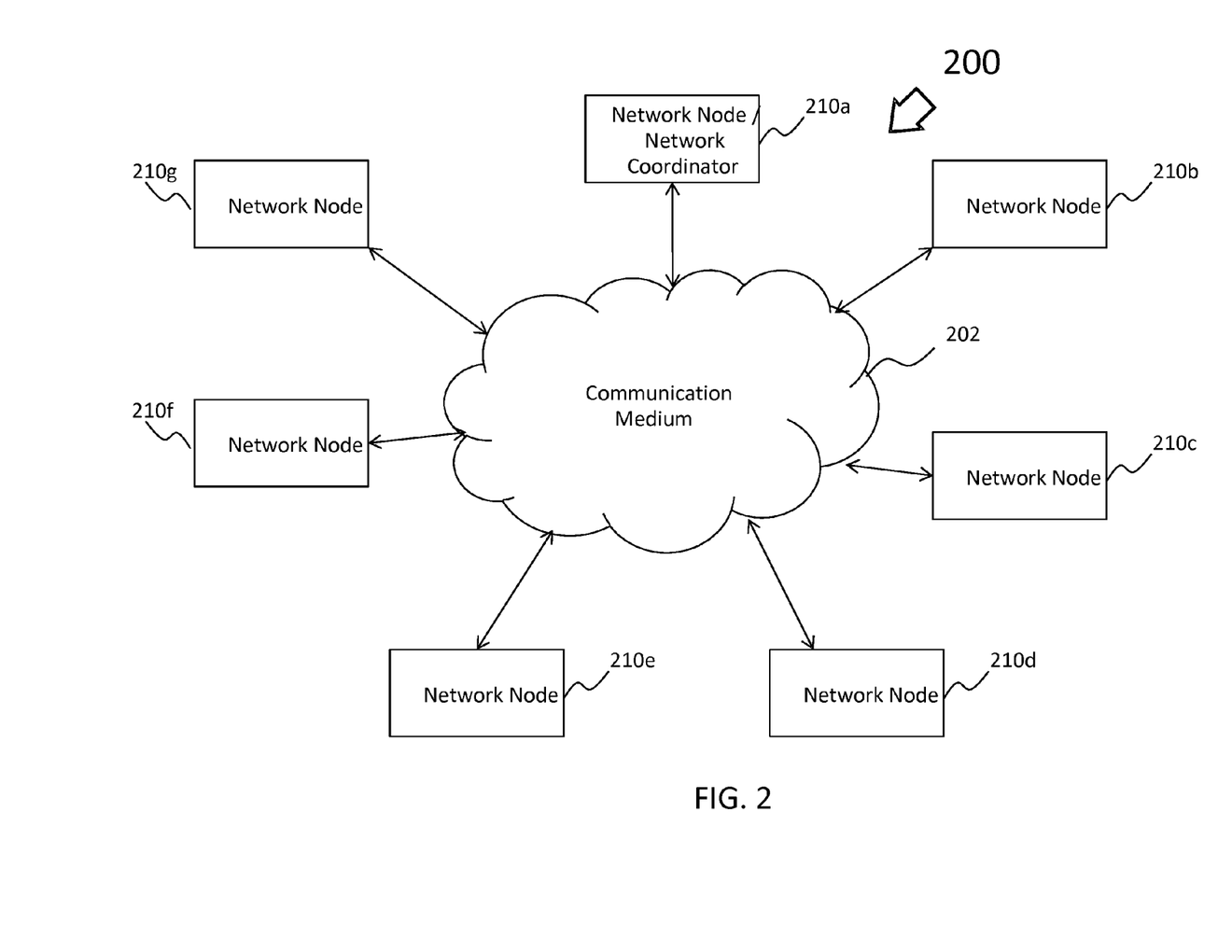
FIG. 2 is a block diagram of a communication system.

FIG. 2 illustrates one example of a communication system 200 (network 200) including a plurality of network nodes 210a-g (collectively referred to as "network nodes 210") each communicating with other nodes through a communication medium 202, which may be channel 202. Examples of the communication medium 202 include, but are not limited to, coaxial cable, fiber optic cable, a wireless transmission medium, an Ethernet connection, or the like. It is understood by those known in the art that the term "network medium" is the same as "communication medium." In one embodiment, communication medium 202 is a coaxial cable network.

Network nodes 210 may be devices of a home entertainment system such as, for example, set top boxes (STBs), television (TVs), computers, DVD or Blu-ray players/recorders, gaming consoles, or the like, coupled to each other via communication medium 202.

In some embodiments, communication system 200 may be a Multimedia over Coax Alliance (MoCA) network. The MoCA architecture dynamically assigns a network node 210 as a network controller/network coordinator (NC) in order to optimize performance. Any network node 210 may be the NC, as is understood by one of ordinary skill in the art; for the sake of this example, assume network node 210a is an NC. Only a device in the NC 210a role is able to schedule traffic for all other nodes 210b-g in the network and form a full mesh network architecture between any device and its peers.

Figure 3:
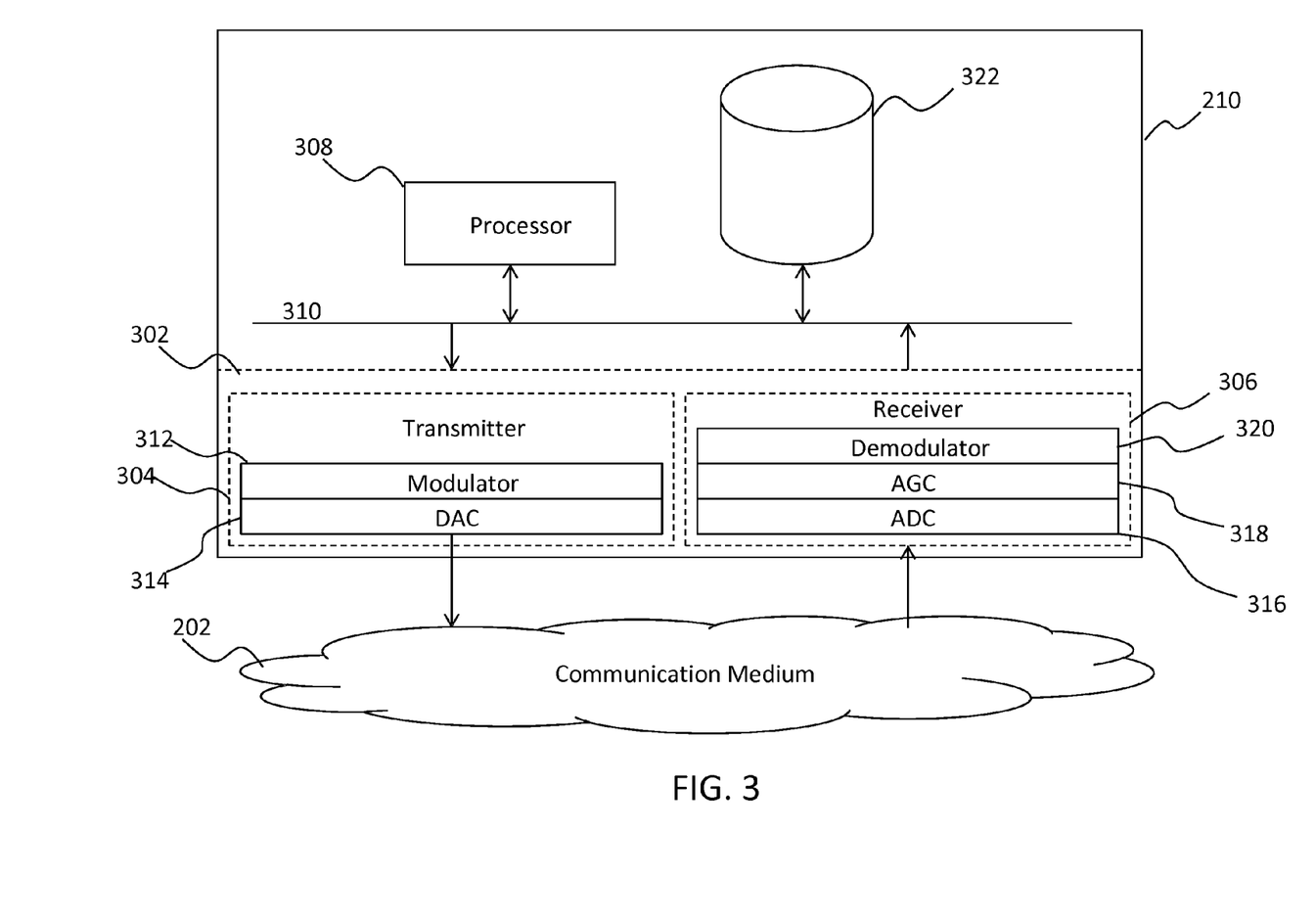
FIG. 3 is a block diagram of a network node in accordance with the communication system illustrated in FIG. 2.

Moving on to FIG. 3, each of the network nodes 210 may include a physical interface 302 including a transmitter 304 and a receiver 306, which are in signal communication with a processor 308 through a data bus 310. The transmitter 304 may include a modulator 312 for modulating data according to a quadrature amplitude modulation (QAM) scheme such as, for example, 8-QAM, 16-QAM, 32-QAM, 64-QAM, 128-QAM, or 256-QAM, or another modulation scheme, and a digital-to-analog converter (DAC) 314 for transmitting modulated signals to other network nodes 300 through the communication medium 202.

Receiver 306 may include an analog-to-digital converter (ADC) 316 for converting an analog modulated signal received from another network node 210 into a digital signal. Receiver 306 may also include an automatic gain control (AGC) circuit 318 for adjusting the gain of the receiver 306 to properly receive the incoming signal and a demodulator 320 for demodulating the received signal. One of ordinary skill in the art will understand that the network nodes 210 may include additional circuitry and functional elements not described herein.

Processor 308 may be any central processing unit (CPU), microprocessor, micro-controller, or computational device or circuit for executing instructions. As shown in FIG. 3, the processor 308 is in signal communication with a computer readable storage medium 322 through data bus 310. The computer readable storage medium may include a random access memory (RAM) and/or a more persistent memory such as a read only memory (ROM). Examples of RAM include, but are not limited to, static random-access memory (SRAM), or dynamic random-access memory (DRAM). A ROM may be implemented as a programmable read-only memory (PROM), an erasable programmable read-only memory (EPROM), an electrically erasable programmable read-only memory (EEPROM), or the like as will be understood by one skilled in the art.

When network 200 is initially formed or when new network nodes 210 are admitted, a link maintenance operation ("LMO") is performed from each network node to every other network node. The LMO is controlled by the NC 210a, which specifies which network node is to perform the LMO. LMO may be performed cyclically, i.e., by cycling through the various network nodes. In general, an LMO involves transmitting probe messages formed using a predetermined bit sequence and length from one network node to another to estimate the channel characteristics between the nodes. The receiving network node measures the energy of received probes and compares the measurements against predefined thresholds to determine the number of bits per subcarrier in accordance with OFDM. In other words, bit loading may be used to adapt the modulation. Bit loading is a method of allocating a higher order signal constellation to subcarriers that have higher signal-to-noise ratio (SNR) and a lower order constellation to carriers that have lower SNR. A modulation profile (bit loading profile) is associated with each node and specifies the modulation used for each subcarrier.

Figure 4:
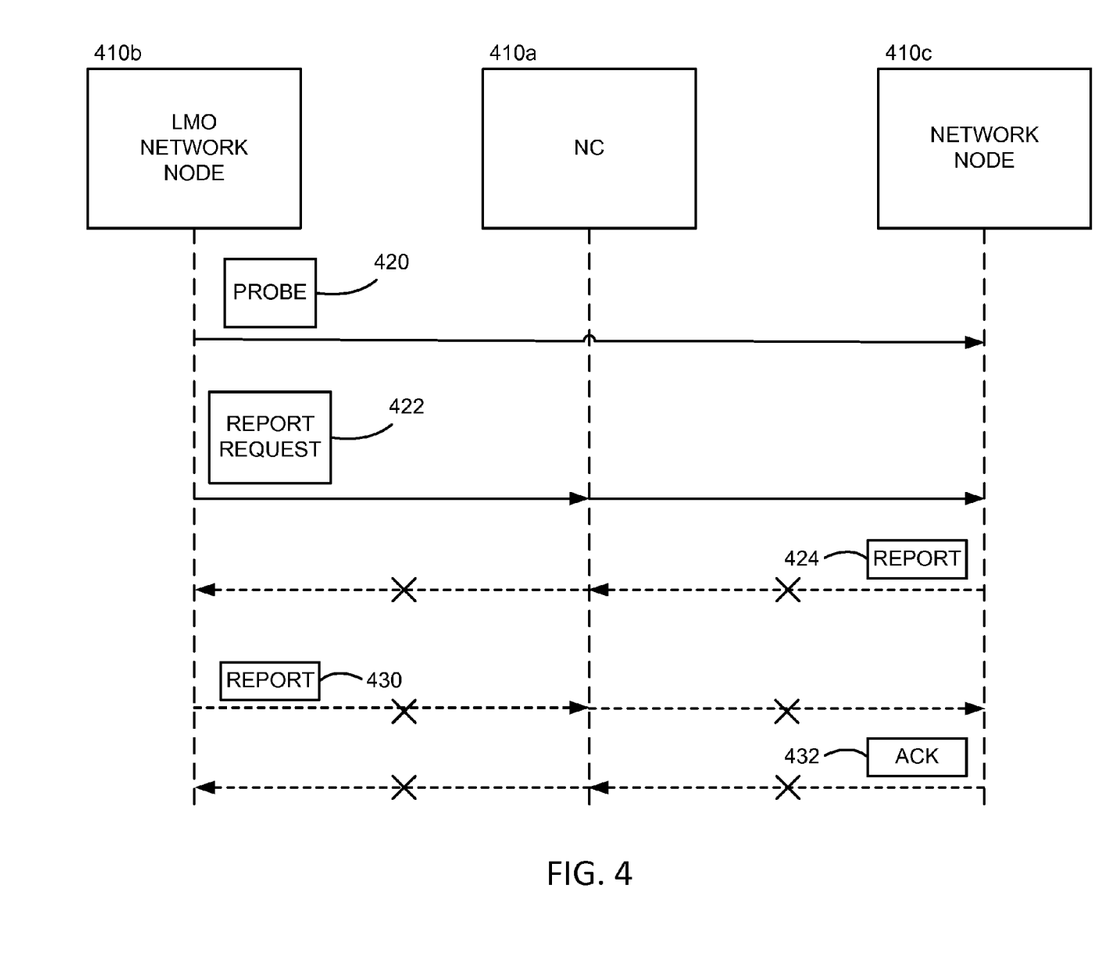
FIG. 4 is a signal diagram illustrating a flow of data across the communication system of FIG. 2.

Referring to FIG. 4, in some embodiments, a probe 420 may be one of a plurality of probes transmitted in support of an LMO. Probe 420 is sent from network node 410b, which is an LMO network node (i.e., a node undergoing LMO) in this example, to another network node 410c. NC 410a and network nodes 410b, 410c may be network nodes 210a, 210b, and 210c of FIG. 2, respectively. Network node 410b sends a report request message 422 that is relayed to network node 410c via NC 410a. Network node 410c sends a probe report 424 directed at network node 410b to inform the latter of a new bit loading to be used for subsequent packets, e.g., to ensure a specified error rate such as $10^{-6}$ in the presence of sustained interference or environmental variations, e.g., variations in temperature or voltage.

In the presence of dynamic interference, adjustment to bit loading might not occur, because report 424 might not be successfully conveyed to network node 410b. Such dynamic interference may occur when an ATSC transmitter is turned on and may cause high packet error rate in excess of the specified error rate (e.g., $10^{-6}$). Dynamic interference may cause incorrect transmission from network node 410c to NC 410a or on the relay from NC 410a to network node 410b, as shown by crosses and dashed lines corresponding to both links in FIG. 4. Based on such dynamic interference, either NC 410a or network node 410b may take corrective measures as follows.

Dynamic interference may cause a predetermined class of messages, e.g., modulation reports, to be received incorrectly. Such modulation reports may be relatively large compared to other messages and may therefore occupy a substantial fraction (or all) of the subcarriers in a channel, e.g., channel 110 in FIG. 1. As a result, such modulation reports may be transmitted using subcarriers such as subcarriers 120-3 and 120-4 that are affected by the dynamic interference. On the other hand, smaller messages such as heartbeat messages may be transmitted using fewer subcarriers and particularly may be transmitted and received successfully without using any subcarriers affected by the interference. Because heartbeat messages are transmitted and received successfully, the network is kept alive. Because modulation reports, which contain adjusted bit loading information for newly turned-on interference, are not received correctly, a modulation profile for an affected node may not be adjusted correctly, hence causing high packet errors to continue. As a result, network 200 may not dissolve, because heartbeats are not problematic, but may operate poorly for large messages.

In some embodiments, network node 410b detects that modulation reports are not being received correctly. For this example, suppose report message 424 is correctly transmitted from network node 410c to NC 410a but incorrectly relayed to LMO network node 410b due to dynamic interference. Network node 410b may detect incorrect reception based on packet error characteristics. For example, each packet, as it is received, is processed by error processing logic that may classify modulation reports as failed receptions. In some embodiments, a determination that modulation reports are not being received correctly is achieved by detecting that a predetermined number of modulation reports is not received in a predetermined time interval. For example, a time window for LMO reception activities may be 25 seconds in accordance with the MoCA v. 1.0 specification or 50 seconds in accordance with MoCA v. 1.1; other windows may be used as well. The predetermined number of failed messages within this window to trigger the determination described above may be four messages, although other numbers may be used as well.

Network node 410b may then disconnect from network 200 (leave network 200) based on the incorrectly received modulation reports. Then, network node 410b may reconnect to network 200 to initiate network node 410b on the network via LMO. For reconnection, a more robust (less dense) modulation profile may be employed than the modulation profile at the time of disconnection. In other words, a back-off technique may be employed for reconnection. Thus, the network 200 and network node 410b in particular may recover from a deadlocked state of network 410b (that may have been caused by dynamic interference and/or relatively high bit loading) by switching to a lower bit loading, at least for the time being (until subsequent readjustment of modulation may occur via LMO). Thus, dynamic interference is advantageously detected and mitigated.

In some embodiments, NC 410a rather than network node 410b may detect and mitigate the dynamic interference. Suppose report message 424 is incorrectly received at NC 410a due to dynamic interference. NC 410a, which is itself a network node, may perform error detection as described above in the context network node 410b, i.e., NC 410a may check for incorrect reception of modulation reports by examining the number of erroneous packets within a time interval.

In various embodiments, interference detection and mitigation are based on processing on a report 430 that is incorrectly transmitted from LMO network node 410b to NC 410a or from NC 410a to network node 410c, or based on processing an acknowledgement (ACK) 432 sent from network node 410c to NC 410a and relayed to LMO network node 410b. In any of these cases, an error may arise on one of the links designated by dashed lines and crosses as in FIG. 4, and the recipient node in each case may detect and mitigate the interference, e.g., by detecting incorrect reception of modulation reports, disconnecting the LMO network node 410b, and reconnecting that node with a more robust modulation profile. Thus, mitigation and detection may proceed in various ways, with the NC 410a as well as other network nodes capable of recovering from deadlock.

Figure 5:
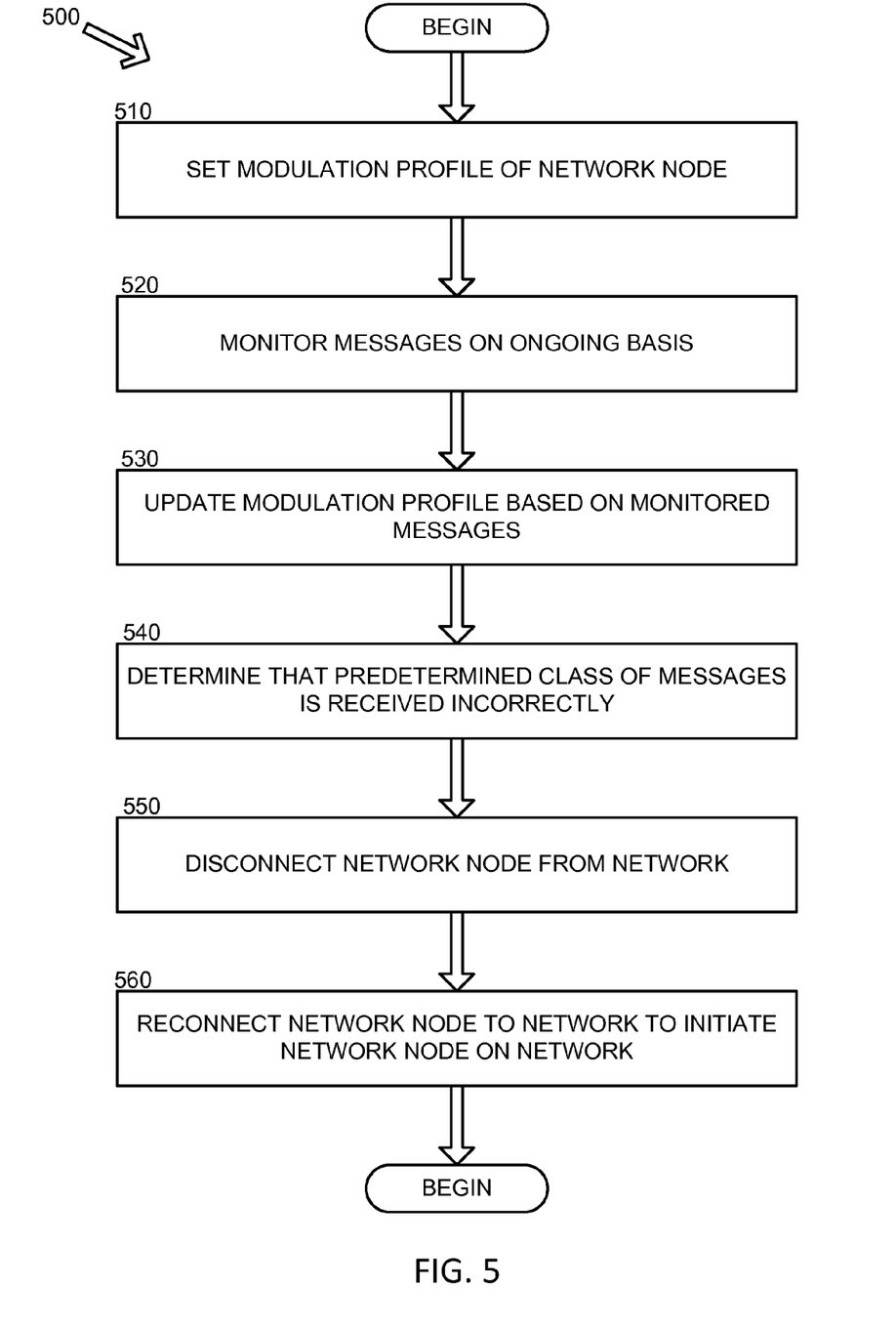
FIG. 5 is a flow diagram in accordance with an exemplary embodiment.

FIG. 5 is a flow diagram in accordance with an exemplary embodiment. After process 500 begins, a modulation profile of a network node, e.g., network node 210b on a network, e.g., network 200, is set (510) at a first density. On an ongoing basis, a plurality of messages received at the network node are monitored (520). The modulation profile is updated continually (530) based on the monitored messages. Such updating may include updating the modulation profile to a second density higher than the first density, i.e., loading more bits onto subcarriers in accordance with the principles of OFDM. A determination is made (540) that a predetermined class of messages is received incorrectly at the network node. The network node is disconnected (550) from the network based on the incorrectly received predetermined class of messages and is then reconnected (56) to the network to initiate the network node on the network. The network node may be reconnected and reinitiated with a new modulation profile having a third density that is less dense than the modulation profile that was used at the time of disconnection, i.e., a back-off may be employed for reconnection. The third density may be the same as the first density or different.

In some embodiments, computer readable storage medium 322 may have instructions stored on it. When executed by processor 308, the instructions may cause processor 308 to perform operations described above, including those of process 500.

Although examples are illustrated and described herein, embodiments are nevertheless not limited to the details shown, since various modifications and structural changes may be made therein by those of ordinary skill within the scope and range of equivalents of the claims.

What is claimed is:

1. A method for adjusting modulation on a network, the method comprising:
setting a first modulation profile of a network node on the network at a first density;
monitoring a plurality of messages received at the network node;
updating the first modulation profile of the network node based on the monitored messages;
determining that a predetermined class of messages is received by the network node at an error rate that is greater than a predetermined error rate;
disconnecting the network node from the network based on the error rate of the received predetermined class of messages; and
reconnecting the network node to the network to re-initiate the network node on the network.

2. The method of claim 1, wherein updating the first modulation profile includes updating the first modulation profile to a second density higher than the first density.

3. The method of claim 2, wherein reconnecting the network node to initiate the network node on the network includes reconnecting the network node with a second modulation profile having a third density less than the second density.

4. The method of claim 3, wherein the third density equals the first density.

5. The method of claim 1, wherein the predetermined class of messages comprises modulation reports.

6. The method of claim 1, wherein determining that the specified class of messages is being received incorrectly includes detecting that a predetermined number of messages of the specified class is not received in a predetermined time interval.

7. The method of claim 6, wherein the predetermined number is four and the predetermined time interval is about ten seconds.

8. The method of claim 1, wherein determining that a predetermined class of messages is being received incorrectly includes determining that dynamic interference is causing the predetermined class of messages to be received incorrectly.

9. A network node comprising:
a receiver that receives a plurality of messages;
a processor coupled to the receiver, the processor programmed to:
set a first modulation profile of the network node at a first density;
monitor the received messages on an ongoing basis;
update the first modulation profile of the network node continually based on the monitored messages;
determine that a predetermined class of messages is received incorrectly at the network node;
disconnect the network node from the network based on the incorrectly received predetermined class of messages; and
reconnect the network node to the network to initiate the network node on the network; and
a transmitter coupled to the processor, the transmitter transmitting data during initiation of the network node on the network.

10. The network node of claim 9, wherein the processor programmed to update the first modulation profile to a second density higher than the first density.

11. The network node of claim 10, wherein the processor programmed to reconnect the network node to initiate the network node on the network with a second modulation profile having a third density less than the second density.

12. The network node of claim 9, wherein the predetermined class of messages comprises modulation reports.

13. The network node of claim 9, wherein determining that the specified class of messages is being received incorrectly includes detecting that a predetermined number of messages of the specified class is not received in a predetermined time interval.

14. A network controller comprising:
a receiver that receives messages in support of a link maintenance operation (LMO) on a network;
a processor coupled to the receiver, the processor programmed to:
monitor the messages on an ongoing basis;
determine that a predetermined class of messages is not received correctly;
disconnect an LMO network node from the network based on the incorrectly received predetermined class of messages; and
reconnect the LMO network node to the network to initiate the LMO network node on the network; and
a transmitter coupled to the processor, the transmitter transmitting the messages in support of the LMO on the network.

15. A non-transitory computer readable storage medium having instructions stored thereon, the instructions when executed by a processor causing the processor to perform the operations of:
setting a first modulation profile of a network node on the network at a first density;
monitoring, on an ongoing basis, a plurality of messages received at the network node;
updating a first modulation profile of the network node continually based on the monitored messages;
determining that a predetermined class of messages is received incorrectly at the network node;
disconnecting the network node from the network based on the incorrectly received messages; and
reconnecting the network node to the network to initiate the network node on the network.

16. The non-transitory computer readable storage medium of claim 15, wherein updating the first modulation profile includes updating the first modulation profile to a second density higher than the first density.

17. The non-transitory computer readable storage medium of claim 16, wherein reconnecting the network node to initiate the network node on the network includes reconnecting the network node with a second modulation profile having a third density less than the second density.

18. The non-transitory computer readable storage medium of claim 15, wherein the predetermined class of messages comprises modulation reports.

19. The non-transitory computer readable storage medium of claim 15, wherein determining that the specified class of messages is being received incorrectly includes detecting that a predetermined number of messages of the specified class is not received in a predetermined time interval.

20. The non-transitory computer readable storage medium of claim 15, wherein determining that a predetermined class of messages is being received incorrectly includes determining that dynamic interference is causing the predetermined class of messages to be received incorrectly.

* * * * *

UNITED STATES PATENT AND TRADEMARK OFFICE
CERTIFICATE OF CORRECTION

| | | |
|---|---|---|
| PATENT NO. | : 8,683,256 B2 | Page 1 of 1 |
| APPLICATION NO. | : 12/822578 | |
| DATED | : March 25, 2014 | |
| INVENTOR(S) | : Jogadhenu | |

It is certified that error appears in the above-identified patent and that said Letters Patent is hereby corrected as shown below:

On the title page, item [75] change "Saga Jogadhenu" to --Sagar Jogadhenu--.

Signed and Sealed this
Seventeenth Day of May, 2016

Michelle K. Lee
*Director of the United States Patent and Trademark Office*